United States Patent [19]

Voigt et al.

[11] 3,839,060

[45] Oct. 1, 1974

[54] WATER-RESISTANT ODORLESS CORRUGATING ADHESIVE

[75] Inventors: John E. Voigt, Fenton; Edward M. Bovier, Dellwood, both of Mo.

[73] Assignee: Anheuser-Busch, Incorporated, St. Louis, Mo.

[22] Filed: Aug. 13, 1973

[21] Appl. No.: 387,914

Related U.S. Application Data

[63] Continuation-in-part of Ser. No. 335,060, Feb. 23, 1973.

[52] U.S. Cl. ............................... 106/213, 260/17.2
[51] Int. Cl. ............................................ C08b 27/22
[58] Field of Search ........... 260/17.2, 17.3; 106/213

[56] References Cited
UNITED STATES PATENTS

| | | | |
|---|---|---|---|
| 2,362,086 | 11/1944 | Myers et al. | 260/17.2 |
| 2,886,541 | 5/1959 | Langlois | 260/17.2 |
| 3,658,733 | 4/1972 | Billy | 260/17.2 |

*Primary Examiner*—Theodore Morris
*Attorney, Agent, or Firm*—Gravely, Lieder & Woodruff

[57] ABSTRACT

This disclosure relates to a waterproof and weather-resistant adhesive composition for use in the manufacture of corrugated board and its preparation. More specifically, it concerns the preparation of a water-resistant, essentially odorless, non-irritating paperboard adhesive using a phenol, an aldehyde and an amino hydroxy compound by reacting the materials "in situ" in a standard corrugating mix resulting in a starch base adhesive which has superior viscosity stability.

11 Claims, No Drawings

WATER-RESISTANT ODORLESS CORRUGATING ADHESIVE

REFERENCE TO OTHER APPLICATIONS

This application is a continuation-in-part of our co-pending application Ser. No. 335,060, filed Feb. 23, 1973 entitled WATER RESISTANT STARCH ADHESIVE.

BACKGROUND OF THE INVENTION

It has been shown in U.S. Pat. Nos. 2,884,389 and 2,886,541 that a starch base corrugating adhesive can be produced that is highly water-resistant to waterproof in nature. Briefly, these two patents disclose reacting phenolic compounds, such as resorcinol, with an aldehyde, such as formaldehyde, under alkaline conditions in the presence of pasted starch so as to form in situ a phenolic-aldehyde resin-starch reaction product. The teaching of these two patents has been employed on a substantial commercial scale in the production of highly water-resistant to waterproof corrugated and laminated paperboard products. U.S. Pat. No. 3,294,716 teaches the addition of borax to the general phenol-aldehyde-starch formula, along with the reduction of concentration of the phenolic compound, to reduce costs and increase machine speed rates for particular corrugated paperboard products that do not require a high degree of water-resistance.

A disadvantage of the alkaline curing aldehydic amylaceous adhesive composition is their limited pot life. Pot life is the length of time, after preparing the adhesive with desired viscosity and other properties, during which the glue properties remain within a range suitable for use. The glue viscosity gradually increases with age, due to polymerization of the water-resistant agent as well as a reaction of the water-resistant agent with the amylaceous component of the glue. The thickening is often accompanied by congealing or gelling of the fluid composition. This change in composition can create operating difficulties for the manufacturer in that it would interefere with the application of the product, increase labor to keep the corrugating machines clean, and limit production of the product to batches small enough to be used within its pot life.

An effective technique for controlling the rate and degree of copolymerization, and thus the viscosity and pot life, is to control the temperature used in pasting the starch components. This in turn controls the degree of dispersion of the starch or dextrin and therefore the availability of the hydroxyl group for reaction with other groups. Starch cooked at the boiling temperature of water or higher is therefore much more reactive than starch cooked at lower temperatures. Alkalinity also has a bearing on the degree of pasting of the starch or dextrin since, in general, increases in alkalinity tend to decrease the pasting temperature.

Accordingly, researchers in the art have used sophisticated methods of altering the variables of time, temperature, alkalinity, and pH in adjusting the viscosity of the product to lengthen the pot life or working life of the product. See Kesler, et al, U.S. Pat. No. 2,650,205, Corwin, et al, U.S. Pat. No. 2,884,389, and Langlois, et al, U.S. Pat. No. 2,890,182.

U.S. Pat. No. 2,890,182 teaches a method of increasing the pot life of the alkaline-curing aldehydic amylaceous adhesives by adding an ingredient, such as ammonia, to the completed liquid adhesive composition that competes with the amylaceous material and the non-aldehydic component of the water-resistant agent for the aldehyde and thus slows the condensation responsible for the thickening and congealing of the composition.

In our co-pending application, Ser. No. 335,060 there is described a water-resistant starch adhesive comprising a phenol and oxazolidine. The odorless starch adhesive possesses a long working life, increased viscosity stability, improved gel temperatures and pH characteristics and is used with corrugated or laminated paperboard.

The present invention relates to an improvement in the working life of low temperature curing starch base adhesives, with said adhesives having increased viscosity stability. The product of this invention is further characterized in that it is essentially odorless and water-resistant. There is no release or irritating and/or odorous fumes such as occurs in the usual formaldehyde containing corrugating systems.

SUMMARY OF THE INVENTION

It is our object of this invention to provide an improved process for corrugating paperboard. Another object of this invention is to provide odorless adhesives having stable viscosity with a longer working life.

It has been discovered that an adhesive composition comprising a combination of a phenol, aldehyde, alkaline dispersed starch, and an amino hydroxy compound selected from the group consisting of monoethanolamine, 2-amino-2-ethyl-1,3-propanediol, 2-amino-2-methyl-1-propanol, 2-amino-2-methyl-1,3-propanediol, and tris (hydroxymethyl) amino methane represented by the following formula:

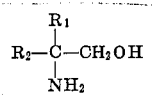

wherein $R_1$ and $R_2$ are hydrogen or alkyl groups of one to three carbon atoms or hydroxyalkyl groups of one to three carbon atoms. $R_1$ and $R_2$ may be the same or different. The composition possesses water-resistant characteristics and is essentially odorless.

DETAILED DISCUSSION

Basically, this adhesive is made similarly to the phenol-aldehyde alkaline curing starch base adhesives. The critical difference is the use of an amino hydroxy compound, such as 2-amino-2-ethyl-1,3-propanediol. The concentration of the amino hydroxy compound is related by way of a mole ratio to the phenol and to the aldehyde, which should be greater than about 0.1 to 1 to 2 and preferably 0.5 to 1 to 2.

The amount of the amino hydroxy compound may be as much as 2 to 1 to 2 in comparison to the phenol and to the aldehyde compounds respectively.

A general review of amino hydroxy compounds is seen in Chemical Review 53, 309–352 (1953).

Four of the amino hydroxy compounds used in the adhesives of the present invention may be obtained from Commercial Solvents Corporation and are sold under the trade names AEPD, AMP, AMPD, and TRISAMINO. Monoethanolamine is a readily available amino hydroxy compound which can be obtained from a number of suppliers.

The starch employed in this invention preferably is unmodified corn starch, but can be any of the starches commonly used in the adhesive art, that is, all starches and dextrins which contain sufficient available hydroxyl groups so that a copolymerization reaction can occur between the hydroxyl groups and the other reactants. The starch or dextrin concentration in any particular formulation depends upon the specific formulation involved and the type of starch or dextrin used. A suggested starch formulation is 1 part starch to about 2 to about 8 parts water, and preferably 1 part starch to 3 to 6 parts water is used. The greater the percentage of starch or dextrin used, the lower will be the water-resistance of the adhesive.

The phenolic compound concentration should be from about 2 to about 20% by weight of the starch, preferably about 3 to about 7.5%. Insofar as the phenolic compounds useful in this invention are concerned, they include resorcinol, phenol, hydroxyquinone, pyrocatechol, pyrogallol, phloroglucinol, hydroxy-hydroquinone, 3,5-xylenol, metacresol and bisphenol. The aldehydic compound concentration should be from about 1% to about 20% by weight of the starch, preferably about 1.5% to about 5%. Insofar as the aldehydic compound useful in this invention are concerned, they include formaldehyde, paraformaldehyde, glyoxal, acetaldehyde and propionaldehyde.

There should be sufficient caustic soda or other alkali used to give a pH of about 8.5 to about 12 in the final mix preferably about 10 to about 11.5. This is about 1 to about 4% NaOH by weight based on the weight of the starch. The NaOH is used to assist in the dispersion of the cooked starch portion, to make the reaction alkaline for the alkaline setting adhesive, and to lower the gelatinization temperature of the raw starch.

In the final composition, the starch should be about 19% to about 30% by weight; the phenolic compound should be about 0.4% to about 6% by weight; the aldehydic compound should be about 0.15% to about 4% by weight; the amino hydroxy compound should be about 0.1% to about 8% by weight; and the water should be about 80% to about 52% by weight.

Of the starch, about 17% to about 36% is gelatinized and about 83% to about 64% is not gelatinized. The gelatinized starch can be pregelatinized or can be gelatinized in the presence of the phenolic compound. The latter is preferred.

A preferred procedure is to mix a part of the starch and the phenolic compound in water under agitation and heat to a temperature of about 125 to about 200°F., preferably 140° to 160°F., for about 10 minutes. At this time the swelling of the starch begins, and the alkali is added to give the slurry a pH of about 10.0 to 11.5. The slurry is mixed for about 10 minutes. Complete dispersion of the starch has not yet occurred and is not desired at this time. More water, the remainder of the starch, and the amino hydroxy and aldehydic compounds are added. The temperature is lowered to 90°F. to 120°F. and within 1 to 2 hours an adhesive composition will be obtained which is essentially odorless, has a stabilized viscosity of 15 to 120 sec. measured by the Brass Cup method, and a satisfactory working life of 24 to 48 hours or longer. The preferred stabilized viscosity is 20 to 60 seconds. The product can be used in the manufacture of corrugated paperboard and possesses a waterproof bond on drying.

The final product involves a polymerization reaction involving starch, the phenolic compound, the amino hydroxy compound, and the aldehydic compound. This results in a number of complex polymers with varying molecular weights with no single resultant formula.

The following examples disclose a number of practical embodiments of the invention which serve to illustrate the invention and suggest other similar embodiments to those skilled in the art. All parts of ingredients are by weight.

EXAMPLE NO. I

A mixture of 91 parts of pearl corn starch and 38.6 parts of resorcinol are slurried in 760 parts of water with agitation. The slurry mixture is heated to 120°F. for 10 minutes. Twenty three parts of a 50% sodium hydroxide solution are added and mixed for 10 minutes. Approximately 950 parts of water are added, and this is followed by the addition of 454 parts of pearl corn starch. Next, 22.8 parts of 2-amino-2-ethyl-1,3-propanediol are added. Finally, 22.8 parts of paraformaldehyde are added. This mixture is kept at a temperature of 105°F. to 115°F. for 1 to 2 hours, and upon drying after application to corrugated board in the usual manner, gave a water-resistant bond comparable to a regular resorcinol-formaldehyde adhesive. Also, the adhesive was essentially odorless and had improved viscosity and pot life stability.

The second portion of water is added to lower the temperature of the pasted starch so that when the unpasted starch is incorporated into the mixture it does not gelatinize.

EXAMPLE NO. II

A primary mixture of 100 parts of pearl corn starch and 45 parts of resorcinol are slurried in 600 parts of water. Twenty parts of a 50% solution of sodium hydroxide are added. The mixture is heated to 150°F., and mixed at that temperature for 10 minutes. Then 625 parts of water are added with mixing.

In a secondary mixture, 500 parts of pearl corn starch are slurried in 1,045 parts of water. The primary mixture is slowly mixed into the secondary. Twenty five parts of 2-amino-2-ethyl-1,3,-propanediol and 25 parts of paraformaldehyde are added. The resultant mixture is kept at 105°F. to 115°F. for 1 hour. The viscosity is stable, and the essentially odorless adhesive, when used to glue corrugated board, gives a good water-resistant bond.

EXAMPLE NO. III

A primary mixture of 100 parts of pearl corn starch and 45 parts of resorcinol are slurried in 600 parts of water. Twenty parts of a 50% solution of sodium hydroxide are added. The mixture is heated to 150°F., and mixed at that temperature for 10 minutes. Then 625 parts of water are added with mixing.

In a secondary mixture, 500 parts of pearl corn starch are slurried in 1,045 parts of water. The primary mixture is slowly mixed into the secondary. Then 37.5 parts of 2-amino-2-methyl-1-propanol and 25 parts of paraformaldehyde are added. The resultant mixture is kept at 105°F. to 115°F. for 1 hour. The viscosity is stable, and the essentially odorless adhesive, when used to glue corrugated board, gives a good water-resistant bond.

What is claimed is:

1. A method of making a starch based adhesive comprising the steps of (a) preparing an aqueous alkaline gelatinized starch carrier containing a phenolic compound and a portion of the total starch solids, (b) mixing therein an aqueous slurry containing the remaining portion of the total starch solids, an aldehydic compound and an amino hydroxy compound of the following formula:

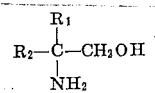

wherein $R_1$ and $R_2$ are the same or different and are hydrogen, alkyl groups of one to three carbon atoms, or hydroxyalkyl groups of one to three carbon atoms.

2. The method of claim 1 wherein the starch carrier is prepared by pasting an aqueous alkaline slurry containing a phenolic compound and a portion of the total starch solids at a temperature of at least about 130°F.

3. The method of claim 1 wherein the amino hydroxy compound is present in the mol ratio of amino hydroxy compound to phenolic compound to aldehydic compound of at least about 0.1 to 1 to 2 and said phenolic compound being present in an amount of about 2% to about 20% by weight of the starch, with said aldehydic compound being present in an amount of about 1% to about 20% by weight of the starch.

4. The method of claim 1 wherein the phenolic compound is selected from a group consisting of resorcinol, phenol, hydroxyquinone, pyrocatechol, pryogallol, phloroglucinol, hydroxy-hydroquinone, 3,5-xylenol, metacresol and bisphenol.

5. The method of claim 1 wherein the aldehydic compound is selected from the group consisting of formaldehyde, paraformaldehyde, glyoxal, acetaldehyde, and propionaldehyde.

6. The method of claim 1 wherein the pH of the adhesive is about 8.5 to about 12.

7. The method of claim 1 wherein the final product is held at a temperature of about 90°F. to about 120°F. for at least about 1 hour before use.

8. A starch based adhesive comprising:
A. about 19% to about 30% starch by weight,
B. about 0.4% to about 6% of a phenolic compound by weight,
C. about 0.15% to about 4% of an aldehydic compound by weight,
D. about 0.1% to about 8% by weight of an amino hydroxy compound which is represented by the formula:

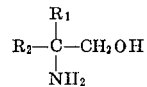

wherein $R_1$ and $R_2$ are the same or different and are hydrogen, alkyl groups of one to three carbon atoms, or hydroxyalkyl groups of one to three carbon atoms,
E. and about 80% to about 52% water by weight,
F. said adhesive being at an alkaline pH.

9. The adhesive of claim 8 wherein the phenolic compound is selected from a group consisting of resorcinol, phenol, hydroxyquinone, pyrocantechol, pyrogallol, phloroglucinol, hydroxy-hydroquinone, 3,5-xylenol, metacresol and bisphenol.

10. The adhesive of claim 8 wherein the aldehydic compound is from the group consisting of formaldehyde, paraformaldehyde, glyoxal, acetaldehyde, and propionaldehyde.

11. The adhesive of claim 8 wherein about 17% to about 36% of the starch is gelatinized and about 83% to about 64% is in ungelatinized form.

* * * * *